(12) United States Patent  (10) Patent No.: US 7,800,795 B2
Kelly et al.                (45) Date of Patent:     Sep. 21, 2010

(54) SCANNING METHOD AND AN IMAGE-PROCESSING DEVICE INCLUDING THE SAME

(75) Inventors: Nancy R Kelly, Rochester, NY (US);
Paul R Conlon, Naples, NY (US)

(73) Assignee: Xerox Corporation, Norwalk, CT (US)

( * ) Notice: Subject to any disclaimer, the term of this patent is extended or adjusted under 35 U.S.C. 154(b) by 459 days.

(21) Appl. No.: 11/854,722

(22) Filed: Sep. 13, 2007

(65) Prior Publication Data

US 2007/0297023 A1 Dec. 27, 2007

Related U.S. Application Data

(62) Division of application No. 11/523,473, filed on Sep. 19, 2006, now Pat. No. 7,315,724, and a division of application No. 10/991,667, filed on Nov. 18, 2004, now Pat. No. 7,133,638.

(51) Int. Cl.
*H04N 1/04* (2006.01)

(52) U.S. Cl. .................. 358/474; 358/1.2; 358/1.9; 358/488; 399/379; 399/376; 382/284; 382/315

(58) Field of Classification Search ............... 358/474, 358/486, 1.2, 1.9, 488, 449, 462, 450, 540; 399/379, 376, 370; 382/284, 315, 289, 199
See application file for complete search history.

(56) References Cited

U.S. PATENT DOCUMENTS

| 5,057,869 | A | * | 10/1991 | Graves et al. | 358/486 |
| 5,528,387 | A | * | 6/1996 | Kelly et al. | 358/488 |
| 5,555,077 | A | * | 9/1996 | Schooley | 399/81 |
| 5,912,448 | A | * | 6/1999 | Sevier et al. | 235/454 |
| 5,940,544 | A | * | 8/1999 | Nako | 382/293 |
| 6,240,215 | B1 | * | 5/2001 | Salgado et al. | 382/254 |
| 6,310,984 | B2 | * | 10/2001 | Sansom-Wai et al. | 382/289 |
| 6,360,026 | B1 | * | 3/2002 | Kulkarni et al. | 382/289 |
| 6,999,209 | B2 | * | 2/2006 | Kelly et al. | 358/474 |
| 7,430,065 | B2 | * | 9/2008 | Arakai et al. | 358/3.26 |

(Continued)

FOREIGN PATENT DOCUMENTS

JP          03011374 A        1/1991

(Continued)

*Primary Examiner*—Negussie Worku
(74) *Attorney, Agent, or Firm*—Gibb I.P. Law Firm, LLC

(57) ABSTRACT

An original comprises a first page and a second page as disposed face-down on the platen surface of an image-processing device. The platen is scanned to form a platen image. The positions of two diagonally-opposite corners of the original are determined based on a fixed platen reference point. An original image is formed by cropping the platen image based on the positions of the two original corners. The size and position of either one selected page or both pages are determined based on the two original corner positions. When the image of only one selected page is desired, the image of the selected page is formed by cropping the original image based on the size and position of the selected page. When the images of both pages are desired, the images of both pages are formed by cropping the original image based on the sizes and positions of both pages.

16 Claims, 7 Drawing Sheets

U.S. PATENT DOCUMENTS

| | | | | |
|---|---|---|---|---|
| 7,679,777 B2 * | 3/2010 | Contino | ...................... | 358/1.6 |
| 2004/0169894 A1 * | 9/2004 | Schroath et al. | ............. | 358/474 |
| 2005/0129436 A1 * | 6/2005 | Kohchi et al. | ................ | 399/376 |
| 2006/0039627 A1 * | 2/2006 | Li et al. | ...................... | 382/289 |
| 2006/0250659 A1 * | 11/2006 | Contino | ...................... | 358/296 |

FOREIGN PATENT DOCUMENTS

JP    07261606 A    10/1995

* cited by examiner

SCANNING METHOD AND AN IMAGE-PROCESSING DEVICE INCLUDING THE SAME

CROSS-REFERENCE TO RELATED APPLICATIONS

This is a divisional of its commonly-assigned parent application Ser. No. 11/523,473 filed 19 Sep. 2006 now U.S. Pat. No. 7,315,724 by the same inventors hereof, and claims the priority benefit of the same application under the provisions of 35 U.S.C. section 120.

The aforementioned parent application Ser. No. 11/523,473 is a divisional of application Ser. No. 10/991,667 filed 18 Nov. 2004 by the same inventors hereof, now U.S. Pat. No. 7,133,638, granted 7 Nov. 2006.

BACKGROUND OF THE INVENTION

It is known for image-processing products to capture individual pages from an original by scanning each page independently. This approach requires two (2) to three (3) scans to determine the size and capture both side pages on the original, which incurs a productivity cost and unnecessary equipment usage for each scan.

As a result, there is a need for an improved scanning method.

SUMMARY OF THE INVENTION

In a first aspect of the invention, there is described a method for scanning an original in an image-processing device wherein the original comprises a first page and a second page with both the first and second pages disposed face-down on an included platen, comprising:
(a) scan the platen;
(b) form a platen image based on scanning the platen;
(c) determine the position of a first original corner with respect to an included fixed platen reference point, thus forming a corresponding first set of original corner platen coordinates and determine the position of a second original corner with respect to the fixed platen reference point, thus forming a corresponding second set of original corner platen coordinates, wherein the first original corner is diagonally opposite the second original corner;
(d) form an original image based on the platen image, the first set of original corner platen coordinates and the second set of original corner platen coordinates;
(e) determine the size and position of the first page and the size and position of the second page based on the first set of original corner platen coordinates and the second set of original corner platen coordinates;
(f) form an image of the first page based on the original image and the size and position of the first page, thus forming a first image; and
(g) form an image of the second page based on the original image and the size and position of the second page, thus forming a second image.

In a second aspect of the invention, there is described a method for scanning an original in an image-processing device wherein the original comprises a first page and a second page with both the first and second pages disposed face-down on an included platen, comprising:
(a) scan the platen;
(b) form a platen image based on scanning the platen;
(c) determine the position of a first original corner with respect to an included fixed platen reference point, thus forming a corresponding first set of original corner platen coordinates and determine the position of a second original corner with respect to the fixed platen reference point, thus forming a corresponding second set of original corner platen coordinates, wherein the first original corner is diagonally opposite the second original corner;
(d) form an original image based on the platen image, the first set of original corner platen coordinates and the second set of original corner platen coordinates;
(e) determine the size and position of a selected page of the first page and the second page, thus forming a selected page, based on the first set of original corner platen coordinates and the second set of original corner platen coordinates; and
(f) form an image of the selected page based on the original image and the size and position of the selected page.

In a third aspect of the invention, there is described an image-processing device arranged for scanning an original comprising a first page and a second page with both the first and second pages disposed face-down on an included platen in accordance with an included method, the method comprising:
(a) scan the platen;
(b) form a platen image based on scanning the platen;
(c) determine the position of a first original corner with respect to an included fixed platen reference point, thus forming a corresponding first set of original corner platen coordinates and determine the position of a second original corner with respect to the fixed platen reference point, thus forming a corresponding second set of original corner platen coordinates, wherein the first original corner is diagonally opposite the second original corner;
(d) form an original image based on the platen image, the first set of original corner platen coordinates and the second set of original corner platen coordinates;
(e) determine the size and position of the first page and the size and position of the second page based on the first set of original corner platen coordinates and the second set of original corner platen coordinates;
(f) form an image of the first page based on the original image and the size and position of the first page, thus forming a first image; and
(g) form an image of the second page based on the original image and the size and position of the second page, thus forming a second image.

In a fourth aspect of the invention, there is described an image-processing device arranged for scanning an original comprising a first page and a second page with both the first and second pages disposed face-down on an included platen in accordance with an included method, the method comprising:
(a) scan the platen;
(b) form a platen image based on scanning the platen;
(c) determine the position of a first original corner with respect to an included fixed platen reference point, thus forming a corresponding first set of original corner platen coordinates and determine the position of a second original corner with respect to the fixed platen reference point, thus forming a corresponding second set of original corner platen coordinates, wherein the first original corner is diagonally opposite the second original corner;
(d) form an original image based on the platen image, the first set of original corner platen coordinates and the second set of original corner platen coordinates;
(e) determine the size and position of a selected page of the first page and the second page, thus forming a selected page, based on the first set of original corner platen coordinates and the second set of original corner platen coordinates; and (f) form an image of the selected page based on the original image and the size and position of the selected page.

DETAILED DESCRIPTION OF THE INVENTION

Briefly, an original comprises a first page (Page A) and a second page (Page B) with both Page A and Page B disposed face-down on the platen surface of an image-processing device. The platen is scanned to form a platen image. The positions of two diagonally-opposite corners of the original are determined based on a fixed platen reference point. An original image is formed by cropping the platen image based on the positions of the two diagonally-opposite corners of the original. The size and position of either one selected page (A or B) or both pages (A and B) are determined based on the positions of the two diagonally-opposite original corners. When the image of only one selected page (A or B) is desired, the image of the selected page (A or B) is formed by cropping the original image based on the size and position of the selected page (A or B) and, optionally, the resulting page image (A or B) is saved or printed. When the images of both Pages A and B are desired, the images of Pages A and B are formed by cropping the original image based on the sizes and positions of Pages A and B and, optionally, the resulting images of Pages A and B are saved or printed.

Figure 1:
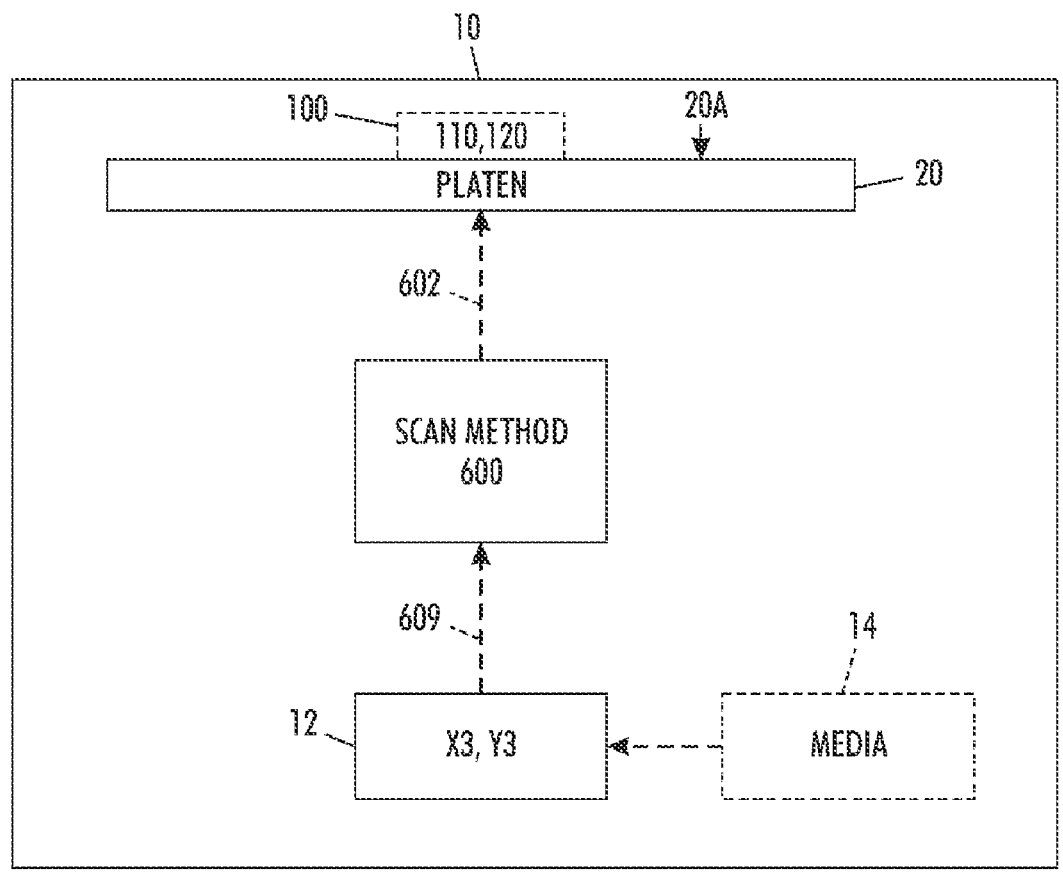
FIG. 1 depicts an image-processing device 10 comprising a platen 20. As shown, an original 100 is arranged so that both an included first page 110 and also an included second page 120 are disposed face-down on an included platen surface 20A. The image-processing device 10 is arranged for scanning the original 100 in accordance with an included process or method 600. In one embodiment, the image-processing device 10 comprises any of a scanning device, a copy machine and a multi-function device.

Referring now to FIG. 1, there is depicted an image-processing device 10 comprising a platen 20. The image-processing device 10 is arranged for scanning an original 100 that is disposed on the platen surface 20A in accordance with an included process or method 300 or 500. As discussed in connection with FIG. 2 below, the original 100 comprises a first page 110 and a second page 120.

Referring still to FIG. 1, in one embodiment the image-processing device 10 comprises a scanning device.

Referring still to FIG. 1, in one embodiment the image-processing device 10 comprises a copy machine.

Referring still to FIG. 1, in one embodiment the image-processing device 10 comprises a multi-function device which includes at least a scanning function.

Figure 2:
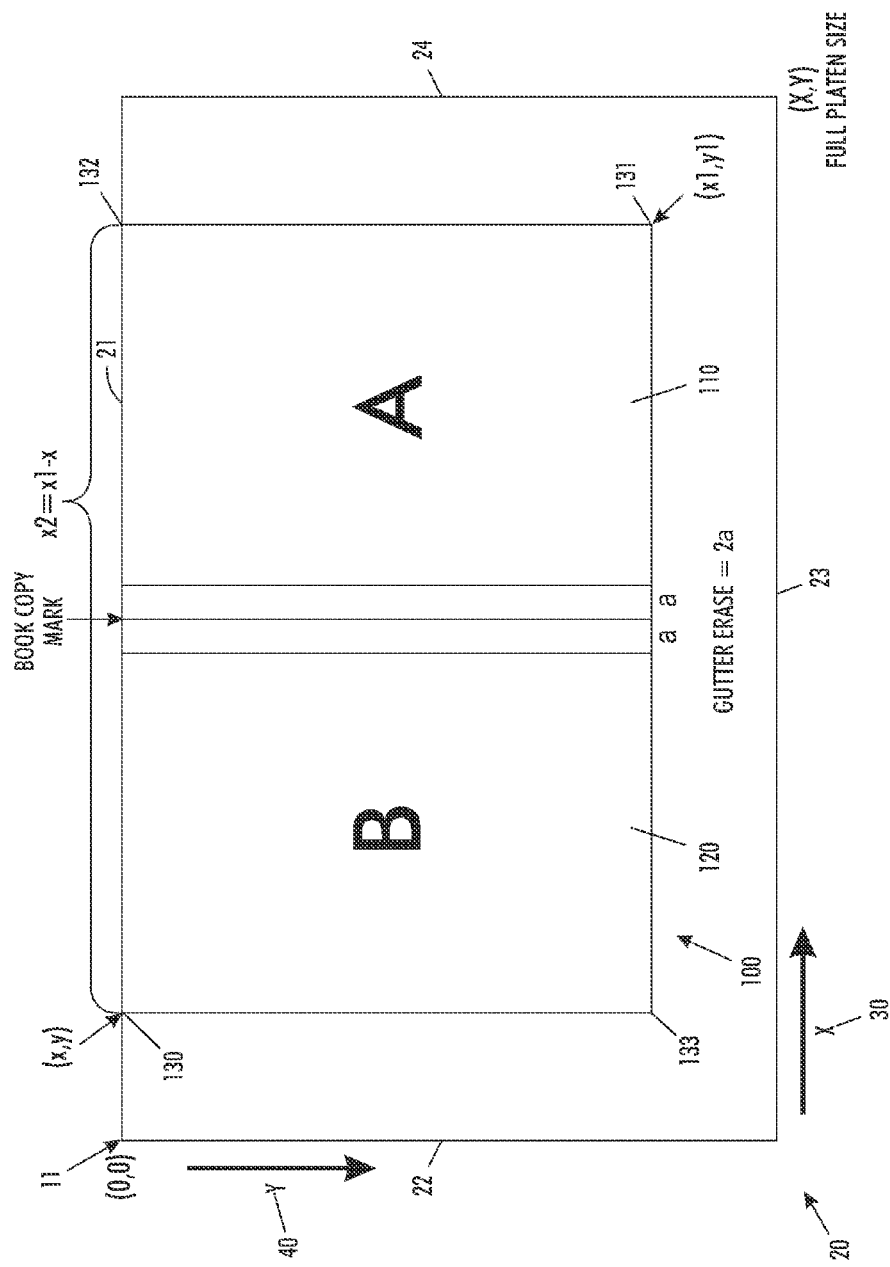
FIG. 2 is a detached, elevated, top-down view of the platen 20 with the original 100 being disposed thereon. As shown, both the original's first page 110 ("Page A") and the second page 120 ("Page B") are disposed face-down on the platen surface 20A. In one embodiment, the first page 110 and the second page 120 are joined or bound together. In one embodiment, the original 100 comprises a book.

Referring now to FIG. 2, there is depicted a detached, elevated, top-down view of the platen 20 with the original 100 disposed on the platen 20 so that both the first page 110 (Page A) and the second page 120 (Page B) are face-down on the platen surface 20A. The platen 20 defines four (4) platen borders designated 21, 22, 23 and 24. Also shown is a fixed platen reference point 11, a first axis 30 designated "X" and a second axis 40 designated "Y", where the X and Y axes are mutually-orthogonal.

Still referring to FIG. 2, the original 100 defines a first corner 130, a second corner 131, a third corner 132 and a fourth corner 133. As shown, the first corner 130 and the second corner 131 are diagonally opposite to each other.

The position of the first corner 130 on the platen surface with respect to the fixed platen reference point 11 is expressed as a first set of coordinates x, y, where the value "x" corresponds to the distance of the first corner 130 from the reference point 11 as measured along the X axis and where the value "y" corresponds to the distance of the first corner 130 from the reference point 11 as measured along the Y axis.

Likewise, the position of the second corner 131 on the platen surface with respect to the fixed platen reference point 11 is expressed as a second set of coordinates x1, y1, where the value "x1" corresponds to the distance of the second corner 131 from the reference point 11 as measured along the X axis and where the value "y1" corresponds to the distance of the second corner 131 from the reference point 11 as measured along the Y axis.

Figure 3:
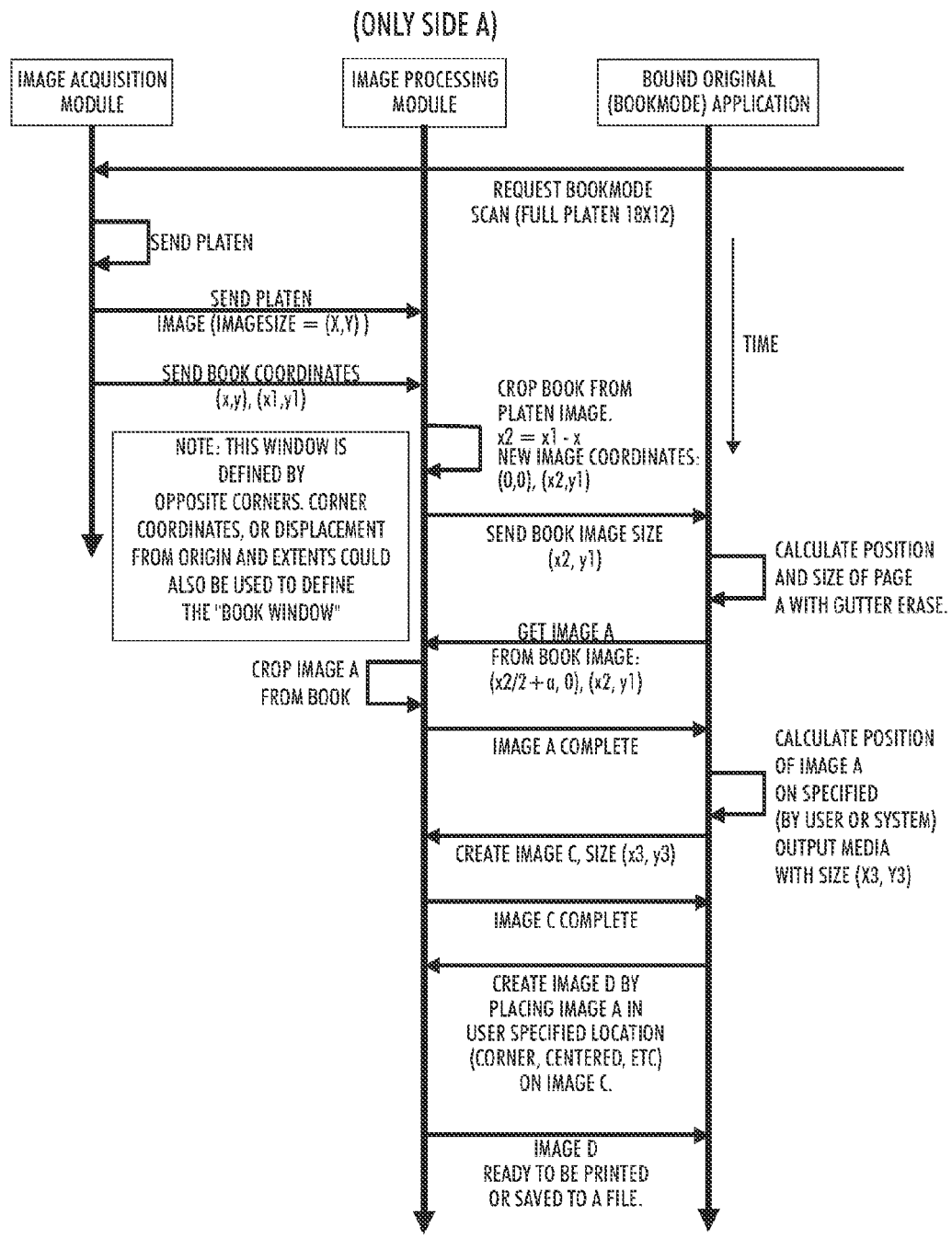
FIG. 3 depicts a sequence diagram of the present invention for forming an image of Page A.

Referring now to FIG. 3, there is depicted a sequence diagram of the present invention for forming an image of Page A.

Figure 4:
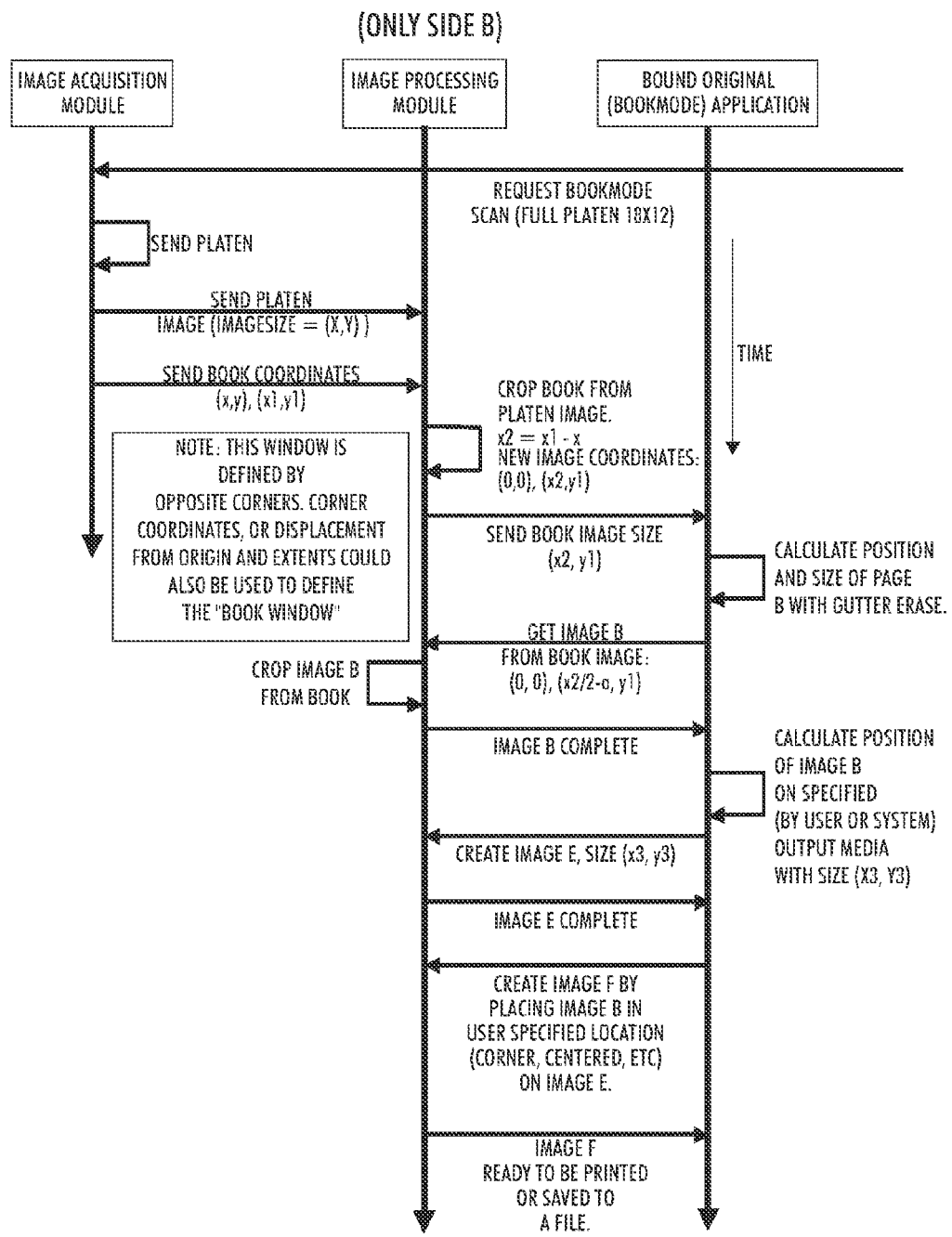
FIG. 4 depicts a sequence diagram of the present invention for forming an image of Page B.

Referring now to FIG. 4, there is depicted a sequence diagram of the present invention for forming an image of Page B.

Figure 5:
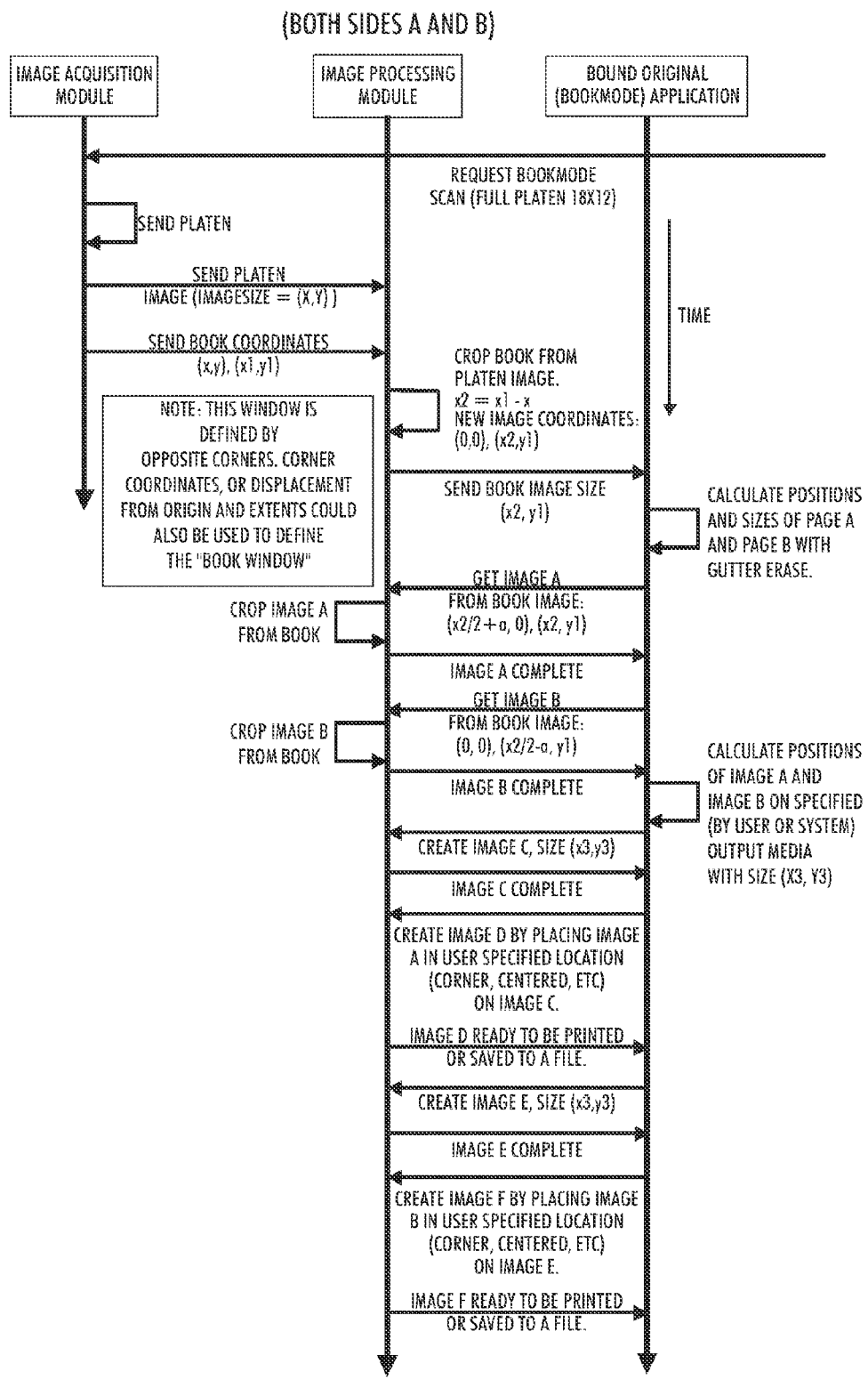
FIG. 5 depicts a sequence diagram of the present invention for forming an image of Page A and an image of Page B.

Referring now to FIG. 5, there is depicted a sequence diagram of the present invention for forming an image of Page A and an image of Page B.

Figure 6A:
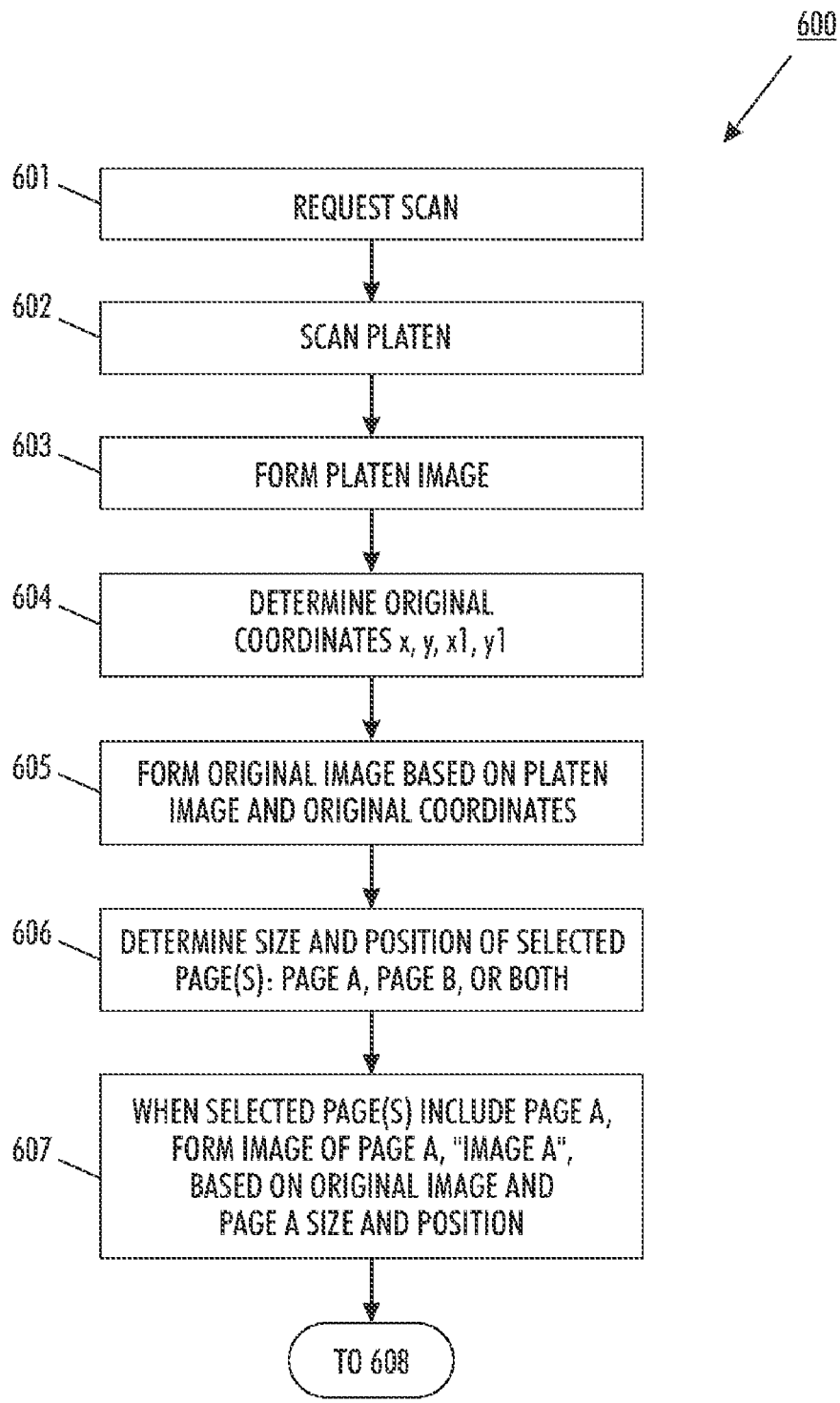
FIGS. 6A-6B is one embodiment of a flow diagram 600 for the present invention.
Figure 6B:
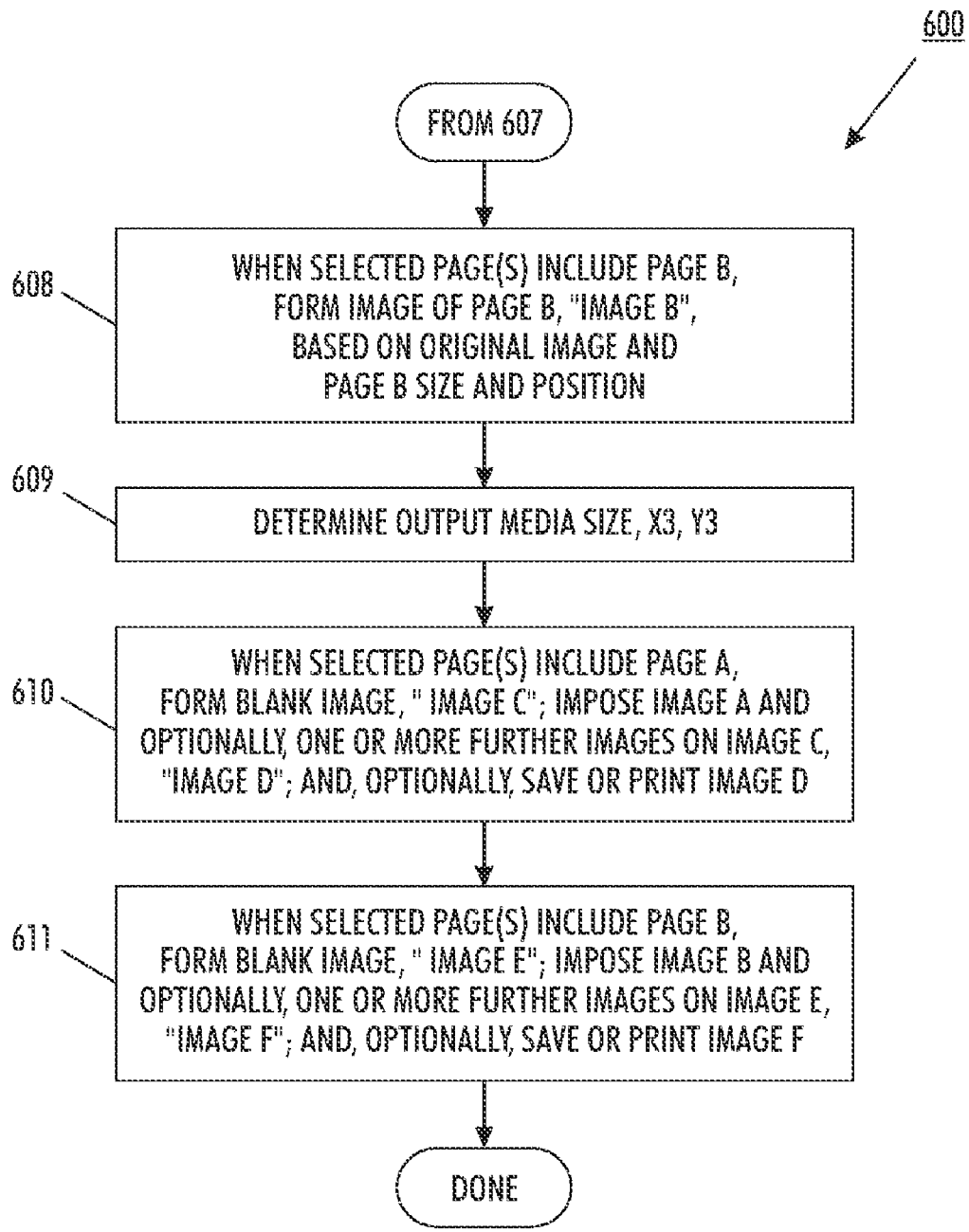

Referring now to FIGS. 6A-6B, there is depicted one embodiment of a flow diagram 600 for the present invention.

The process 600 starts when a scan of the original 100 is requested, step 601. The process then goes to step 602.

In step 602, the process scans the platen 20. The process then goes to step 603.

In step 603, the process forms a platen image based on the platen scanning step 602. The process then goes to step 604.

In step 604, the process determines the position of the first original corner 130 on the platen surface 20A with respect to the fixed platen reference point 11, thus forming the corresponding first set of original corner platen coordinates, x, y; and the process determines the position of the second original corner 131 on the platen surface 20A with respect to the fixed platen reference point 11, thus forming the corresponding second set of original corner platen coordinates, x1, y1, wherein the first original corner 130 is diagonally opposite the second original corner 131. For good understanding, the first original corner 130, the first set of original corner platen coordinates, x, y, the second original corner 131 and the second set of original corner platen coordinates, x1, y1 are shown in FIG. 2. After step 604 is complete the process goes to step 605.

In step 605, the process forms an original image based on the platen image formed in step 603 and further based on the first set of original corner platen coordinates, x, y, and the second set of original corner platen coordinates, x1, y1 formed in step 604. After step 605 is complete the process goes to step 606.

In step 606, the process determines the size and position of the one or more selected pages of the first page 110 (Page A) the second page 120 (Page B) based on the first set of original corner platen coordinates, x, y, and the second set of original corner platen coordinates, x1, y1.

With momentary cross reference to FIG. 3, it will be understood that when the selected pages include the first page 110 (Page A), step 606 determines the size and position of the first page (Page A).

Further, with momentary cross reference to FIG. 4, it will be understood that when the selected pages include the second page 120 (Page B), step 606 determines the size and position of the second page (Page B).

Further, with momentary cross reference to FIG. 5, it will be understood that when the selected pages include both the first page 110 (Page A) and the second page 120 (Page B), step 606 determines the sizes and positions of both the first page (Page A) and the second page (Page B).

Still referring to step 606, with momentary cross-reference to FIG. 2, it will be understood that the size and position of any of the Page A and Page B are further determined based on the gutter offset from the horizontal (X-axis) mid-point of the book image coordinates. In FIG. 2, the gutter value is represented by reference letter "a".

After step 606 is complete, the process goes to step 607.

Still referring to FIGS. 6A-6B, in step 607, when the selected pages include the first page 110 (Page A), the process forms an image of Page A based on the original image formed in step 605 and the size and position of Page A formed in step 606, thus forming a first image ("Image A"). The process then goes to step 608.

In step 608, when the selected pages include the second page 120 (Page B), the process forms an image of Page B based on the original image formed in step 605 and the size and position of Page B, thus forming a second image ("Image B"). The process then goes to step 609.

In step 609, the process determines an output media size characterized by a set of media size values, x3, y3, based on an output media information 12. For good understanding, the media size values x3 and y3 comprise the two (2) dimensional values that characterize the size of the output media 14. For good understanding, the output media information 12, the media size values x3 and y3, and the output media 14 are shown in FIG. 1. After step 609 is complete, the process goes to step 610.

Referring still to FIGS. 6A-6B, in step 610, when the selected pages include the first page 110 (Page A), the process forms a third image ("Image C") comprising a blank or "canvas" image based on the output media size values x3, y3; and the process imposes the first image (Image A) formed in step 607 and, optionally, one or more further or additional images on the third image (Image C), thus forming a fourth image ("Image D"); and the process saves the fourth image (Image D) to a file or prints the fourth image (Image D) on a sheet of output media 14.

Still referring to step 610, in one embodiment the optional one or more further or additional images comprise one or more images of the first page 110 (Page A).

Still referring to step 610, in one embodiment the first image (Image A) is imposed in a user-specified position of the third image (Image C).

Still referring to step 610, in one embodiment the user-specified position is a designated corner of the third image (Image C).

Still referring to step 610, in one embodiment the user-specified position is the center of the third image (Image C).

After step 610 is complete, the process goes to step 611.

In step 611, when the selected pages include the second page 120 (Page B), the process forms a fifth image ("Image E") comprising a blank or canvas image based on the output media size values x3, y3; and the process imposes the second image (Image B) formed in step 608 and, optionally, one or more further or additional images on the fifth image (Image E), thus forming a sixth image ("Image F"); and the process saves the sixth image (Image F) to a file or prints the sixth image (Image F) on a sheet of the output media 14.

Still referring to step 611, in one embodiment the optional one or more further or additional images comprise one or more images of the second page 120 (Page B).

Still referring to step 611, in one embodiment the second image (Image B) is imposed in a user-specified position of the fifth image (Image E).

Still referring to step 611, in one embodiment the user-specified position is a designated corner of the fifth image (Image E).

Still referring to step 611, in one embodiment the user-specified position is the center of the fifth image (Image E).

After step 611 is complete, the process goes to step 612.

In step 612, the process is complete.

Referring generally to the drawing, especially FIG. 2, individual side pages (A and B) may be thought of as sub-images of the overall scanned document image. By introducing a cropping capability, these sub-images can be manipulated and used for multiple purposes, including a original. By adding the ability to define a cropping sub-window on an image used for a low-level imposition operation (onto a canvas), the side pages can be imposed on a canvas as part of an image processing service. The cropping step creates new individual page images, each with its own respective Image ID. In one embodiment, the service invokes the cropping once to obtain a single image (either A or B), or twice to obtain both images A and B. High-speed digital image processing hardware efficiently performs cropping as a post-scan operation. Individual images are thus obtained in a single scan.

Moreover, the present invention captures the entire original document image in a single scan and derives the individual pages via image cropping. Whereas prior multi-scan approaches may involve mechanical scans to capture individual page images, the present invention performs segmentation using digital imaging electronics.

After cropping, the present invention imposes the image appropriately onto a background "canvas" image. In one embodiment, both cropping operations are invoked in a single call, so that additional gains in performance may be achieved by specifying some crop/imposition combinations in a single call. In addition to productivity gains, scanning equipment usage and customer scan light exposure may be reduced by approximately 66% as compared to a multi-scan approach.

In summary, an original 100 comprises a first page 110 (Page A) and a second page 120 (Page B) with both Pages A and B disposed face-down on the platen surface 20A of an image-processing device 10.

In steps 602 and 603, the platen is scanned to form a platen image.

In step 604, the positions of two diagonally-opposite corners 130, 131 of the original are determined based on a fixed platen reference point 11, thus forming the first set of original corner platen coordinates x, y and the second set of original corner platen coordinates x1, y1.

In step 605, an original image is formed by cropping the platen image based on the positions of the two diagonally-opposite corners of the original.

In step 606, the size and position of one or more selected page(s) of Page A and Page B are determined based on the positions of the two diagonally-opposite corners of the original.

When the selected page(s) include Page A, in steps 607 and 610 an image of Page A is formed by cropping the original image based on the size and position of Page A and, optionally, the resulting Page A image is saved or printed.

When the selected page(s) include Page B, in steps 608 and 611 an image of Page B is formed by cropping the original image based on the size and position of Page B and, optionally, the resulting Page B image is saved or printed.

Thus, there has been described the first aspect of the invention substantially as described in claim 1 below, namely, the method 600 for scanning an original 100 in an image-processing device 10 wherein the original comprises a first page 110 (Page A) and a second page 120 (Page B) with both the first and second pages (Pages A and B) disposed face-down on an included platen 20, the method 600 comprising:

(a) in step 602, scan the platen;
(b) in step 603, form a platen image based on scanning the platen;
(c) in step 604, determine the position of a first original corner 130 with respect to an included fixed platen reference point 11, thus forming a corresponding first set of original corner platen coordinates (x, y) and determine the position of a second original corner 131 with respect to the fixed platen reference point 11, thus forming a corresponding second set of original corner platen coordinates (x1, y1), wherein the first original corner 130 is diagonally opposite the second original corner 131;
(d) in step 605, form an original image based on the platen image, the first set of original corner platen coordinates (x, y) and the second set of original corner platen coordinates (x1, y1);
(e) in step 606, determine the size and position of the first page (Page A) and the size and position of the second page (Page B) based on the first set of original corner platen coordinates (x, y) and the second set of original corner platen coordinates (x1, y1);
(f) in step 607, form an image of the first page (Page A) based on the original image and the size and position of the first page, thus forming a first image (Image A); and
(g) in step 608, form an image of the second page (Page B) based on the original image and the size and position of the second page, thus forming a second image (Image B).

Further, as described in claim 2 below, in one embodiment the first aspect of the invention includes:

(h) in step 609, determine an output media size (x3, y3) based on an output media information;
(i) in step 610, form a third image (Image C) comprising a blank image based on the output media size; and
(j) in step 610, impose the first image (Image A) on the third image (Image C), thus forming a fourth image (Image D).

Further to the first aspect of the invention, as described in claim 3 below, in one embodiment the image imposing step (j) includes imposing one or more further images on the third image, thus forming the fourth image.

Further to the first aspect of the invention, as described in claim 4 below, in one embodiment the user-specified position is a designated corner of the third image or the center of the third image.

Further, as described in claim 5 below, in one embodiment the first aspect of the invention includes:

(k) in step 610, save the fourth image to a file or print the fourth image on a sheet of the output media.

Further, as described in claim 6 below, in one embodiment the first aspect of the invention includes:

(l) in step 611, form a fifth image (Image E) comprising a blank image based on the output media size; and
(m) in step 611, impose the second image (Image B) on the fifth image (Image E), thus forming a sixth image (Image F).

Further to the first aspect of the invention, as described in claim 7 below, in one embodiment the image imposing step (m) includes imposing one or more further images on the fifth image, thus forming the sixth image.

Further to the first aspect of the invention, as described in claim 8 below, in one embodiment the second image is imposed in a user-specified position of the fifth image.

Further, as described in claim 9 below, in one embodiment the first aspect of the invention includes:

(n) in step 611, save the sixth image to a file or print the sixth image on a sheet of the output media.

Further to the first aspect of the invention, as described in claim 10 below, in one embodiment the first page (Page A) and the second page (Page B) are joined or bound together.

Also, there has been described the second aspect of the invention substantially as described in claim 11 below, namely, the method 600 for scanning an original 100 in an image-processing device 10 wherein the original comprises a first page 110 (Page A) and a second page 120 (Page B) with both the first and second pages (Pages A and B) disposed face-down on an included platen 20, the method 600 comprising:

(a) in step 602, scan the platen;
(b) in step 603, form a platen image based on scanning the platen;
(c) in step 604, determine the position of a first original corner 130 with respect to an included fixed platen reference point 11, thus forming a corresponding first set of original corner platen coordinates (x, y) and determine the position of a second original corner 131 with respect to the fixed platen reference point 11, thus forming a corresponding second set of original corner platen coordinates (x1, y1), wherein the first original corner 130 is diagonally opposite the second original corner 131;
(d) in step 605, form an original image based on the platen image, the first set of original corner platen coordinates (x, y) and the second set of original corner platen coordinates (x1, y1);
(e) in step 606 determine the size and position of a selected page of the first page (Page A) and the second page (Page B), thus forming a selected page (Page A or Page B), based on the first set of original corner platen coordinates (x, y) and the second set of original corner platen coordinates (x1, y1); and
(f) in step 607 when the selected page is Page A, or in step 608 when the selected page is Page B, form an image of the selected page (Page A or Page B) based on the original image and the size and position of the selected page (Page A or Page B).

Further, as described in claim 12 below, in one embodiment the second aspect of the invention includes:

(g) in step 609, determine an output media size (x3, y3) based on an output media information;
(h) in step 610 when the selected page is Page A, or in step 611 when the selected page is Page B, form a blank image (Image C when the selected page is Page A, or Image E when the selected page is Page B) based on the output media size; and (i) in step 610 when the selected page is Page A, or in step 611 when the selected page is Page B, impose the image of the selected page (Page A or Page B) on the blank image (Image C when the selected page is Page A, or Image E when the selected page is Page B), thus forming a resulting image (Image D when the selected page is Page A, or Image F when the selected page is Page B).

Further to the second aspect of the invention, as described in claim 13 below, in one embodiment the image imposing step (i) includes, in step 610 when the selected page is Page A, or in step 611 when the selected page is Page B, imposing one or more further images on the blank image (Image C when the selected page is Page A, or Image E when the selected page is Page B), thus forming the resulting image (Image D when the selected page is Page A, or Image F when the selected page is Page B).

Further to the second aspect of the invention, as described in claim 14 below, in one embodiment the image of the selected page (Page A or Page B) is imposed in a user-specified position of the blank image (Image C when the selected page is Page A, or Image E when the selected page is Page B).

Further to the second aspect of the invention, as described in claim 15 below, in one embodiment the user-specified position is a designated corner of the blank image (Image C when the selected page is Page A, or Image E when the selected page is Page B) or the center of the blank image (Image C when the selected page is Page A, or Image E when the selected page is Page B).

Further, as described in claim 16 below, in one embodiment the second aspect of the invention includes, in step 610 when the selected page is Page A, or in step 611 when the selected page is Page B, a step of saving the resulting image (Image D when the selected page is Page A, or Image F when the selected page is Page B) to a file.

Further, as described in claim 17 below, in one embodiment the second aspect of the invention is performed in any of a scanning device, a copy machine and a multi-function device.

Further, as described in claim 18 below, in one embodiment the second aspect of the invention includes, in step 610 when the selected page is Page A, or in step 611 when the selected page is Page B, a step of printing the resulting image (Image D when the selected page is Page A, or Image F when the selected page is Page B) on a sheet of the output media 14.

Further, as described in claim 19 below, in one embodiment the second aspect of the invention is performed in a copy machine.

Further to the second aspect of the invention, as described in claim 20 below, in one embodiment the first page (Page A) and the second page (Page B) are joined or bound together.

Also, there has been described the third aspect of the invention substantially as described in claim 21 below, namely, the image-processing device 10 arranged for scanning an original 100 comprising a first page 110 (Page A) and a second page 120 (Page B) with both the first and second pages (Pages A and Page B) disposed face-down on an included platen 20 in accordance with the included method 600, the method 600 comprising:

(a) in step 602, scan the platen;
(b) in step 603, form a platen image based on scanning the platen;
(c) in step 604, determine the position of a first original corner 130 with respect to an included fixed platen reference point 11, thus forming a corresponding first set of original corner platen coordinates (x, y) and determine the position of a second original corner 131 with respect to the fixed platen reference point 11, thus forming a corresponding second set of original corner platen coordinates (x1, y1), wherein the first original corner 130 is diagonally opposite the second original corner 131;
(d) in step 605, form an original image based on the platen image, the first set of original corner platen coordinates (x, y) and the second set of original corner platen coordinates (x1, y1);
(e) in step 606, determine the size and position of the first page (Page A) and the size and position of the second page (Page B) based on the first set of original corner platen coordinates (x, y) and the second set of original corner platen coordinates (x1, y1);
(f) in step 607, form an image of the first page (Page A) based on the original image and the size and position of the first page, thus forming a first image (Image A); and
(g) in step 608, form an image of the second page (Page B) based on the original image and the size and position of the second page, thus forming a second image (Image B).

Also, there has been described the fourth aspect of the invention substantially as described in claim 31 below, namely, the image-processing device 10 arranged for scanning an original 100 comprising a first page 110 (Page A) and a second page 120 (Page B) with both the first and second pages (Pages A and Page B) disposed face-down on an included platen 20 in accordance with the included method 600, the method 600 comprising:

(a) in step 602, scan the platen;
(b) in step 603, form a platen image based on scanning the platen;
(c) in step 604, determine the position of a first original corner 130 with respect to an included fixed platen reference point 11, thus forming a corresponding first set of original corner platen coordinates (x, y) and determine the position of a second original corner 131 with respect to the fixed platen reference point 11, thus forming a corresponding second set of original corner platen coordinates (x1, y1), wherein the first original corner 130 is diagonally opposite the second original corner 131;
(d) in step 605, form an original image based on the platen image, the first set of original corner platen coordinates (x, y) and the second set of original corner platen coordinates (x1, y1);
(e) in step 606 determine the size and position of a selected page of the first page (Page A) and the second page (Page B), thus forming a selected page (Page A or Page B), based on the first set of original corner platen coordinates (x, y) and the second set of original corner platen coordinates (x1, y1); and
(f) in step 607 when the selected page is Page A, or in step 608 when the selected page is Page B, form an image of the selected page (Page A or Page B) based on the original image and the size and position of the selected page (Page A or Page B).

While various embodiments of a scanning method and an image-processing device including the same, in accordance with the present invention, are described above, the scope of the invention is defined by the following claims.

What is claimed is:

1. A document scanning method comprising:
   scanning a platen to form a platen image of an original document, said original document comprising a first page and a second page positioned laterally adjacent to said first page, said original document further being disposed face-down on said platen; and,
   after said scanning, processing, by a processor, said platen image, and said processing comprising:

determining positions of two diagonally opposite corners of said original document based on a fixed platen reference point;

based on said positions of said two diagonally-opposite corners, determining a size and a position of at least one of said first page and said second page on said platen image; and based on said size and position, cropping said platen image in order to form a separate image of said at least one of said first page and said second page.

2. The method of claim 1, said determining of said size and said position of said at least one of said first page and said second page on said platen image further being based on a predetermined gutter offset from a midpoint along an x-axis between said two diagonally-opposite corners.

3. The method of claim 1,
said determining of said size and said position of said at least one of said first page and said second page comprising determining a corresponding size and position of each of said first page and said second page; and
said cropping of said platen image further comprising, based on said corresponding size and position of said each of said first page and said second page, cropping said platen image in order to form separate images of both said first page and said second page.

4. The method of claim 1, said first page being any one of joined and bound to said second page.

5. The method of claim 1, further comprising, after said forming of said at least one separate image, performing any one of the following:
saving said at least one separate image;
printing said at least one separate image; and
imposing said at least one separate image on an additional image.

6. An image-processing device comprising:
a platen supporting an original document, said original document comprising a first page and a second page positioned laterally adjacent to said first page and disposed face-down on said platen:
a scanner scanning said platen to form a platen image of said original document; and
a processor processing said platen image after said scanning, said processing comprising:
determining positions of two diagonally-opposite corners of said original document based on a fixed platen reference point;
based on said positions of said two diagonally-opposite corners, determining a size and a position of at least one of said first page and said second page on said platen image; and
based on said size and position, cropping said platen image in order to form a separate image of said at least one of said first page and said second page.

7. The image-processing device of claim 6, said determining of said size and said position of said at least one of said first page and said second page on said platen image further being based on a predetermined gutter offset from a midpoint along an x-axis between said two diagonally-opposite corners.

8. The image-processing device of claim 6,
said determining of said size and said position of said at least one of said first page and said second page comprising determining a corresponding size and position of each of said first page and said second page; and
said cropping of said platen image further comprising, based on said corresponding size and position of said each of said first page and said second page, cropping said platen image in order to form separate images of both said first page and said second page.

9. The image-processing device of claim 6 comprising any of a scanning device, a copy machine and a multi-function device.

10. The image-processing device of claim 6, said first page being any one of joined and bound to said second page.

11. The image-processing device of claim 6, said processor further performing any one of the following, after said forming of said at least one separate image:
saving, to a memory, said at least one separate image;
transmitting, to a printer, said at least one separate image for printing; and
imposing said at least one separate image on an additional image.

12. A document scanning method comprising: scanning a platen to form a platen image of an original document, said original document comprising a first page and a second page positioned laterally adjacent to said first page and said original document further being disposed face-down on said platen; and, after said scanning, processing, by processor, said platen image, said processing comprising: determining positions of two diagonally-opposite corners of said original document based on a fixed platen reference point; based on said positions of said two diagonally-opposite corners and on a predetermined gutter offset, determining a size and a position of at least one of said first page and said second page on said platen image so as to define at least one cropping window within said platen image; and cropping said platen image according to said at least one cropping window in order to form at least one separate image.

13. The method of claim 12, said predetermined gutter offset being measured from a midpoint along an x-axis between said two diagonally-opposite corners.

14. The method of claim 12,
said determining of said size and said position of said at least one of said first page and said second page comprising determining a corresponding size and position of each of said first page and said second page so as to define multiple cropping windows within said platen image; and
said cropping of said platen image further comprising cropping said platen image according to said multiple cropping windows in order to form separate images of both said first page and said second page.

15. The method of claim 12, said first page being bound to said second page.

16. The method of claim 12, further comprising, after said forming of said at least one separate image, performing any one of the following:
saving said at least one separate image;
printing said at least one separate image; and
imposing said at least one separate image on an additional image.

* * * * *